United States Patent Office 3,033,834
Patented May 8, 1962

3,033,834
SULFONATION OF ALKENYLAROMATIC RESINS WITH SULFURIC ACID
Harold H. Roth, Bay City, Mich., assignor to The Dow Chemical Company, Midland, Mich., a corporation of Delaware
No Drawing. Filed Sept. 2, 1958, Ser. No. 758,583
8 Claims. (Cl. 260—79.3)

This invention relates to the sulfonation of benzene-soluble alkenylaromatic resins by reaction thereof with sulfuric acid to obtain resin sulfonic acids. It particularly pertains to an improvement in such sulfonation process wherein the alkenylaromatic resin is employed in the form of a pre-formed solution in a liquid chlorinated hydrocarbon medium and the resin sulfonate is obtained as solidified beads suspended in such medium and stabilized by the presence of a colloidal particle emulsifier-stabilizer.

The starting resins with which this invention is concerned are benzene-soluble alkenylaromatic resins, by which term is meant solid addition polymers having recurring structural units at least 50 percent by weight of which correspond to at least one of the alkenylaromatic compounds having the general formula:

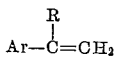

wherein the symbol Ar represents a monovalent aromatic radical having its valence bond on a carbon atom of a sulfonatable aromatic nucleus, the symbol R represents hydrogen or a methyl radical, and the other symbols have their usual meanings. Examples of such alkenylaromatic resins which can be sulfonated in accordance with the present invention are the solid homopolymers of styrene, α-methylstyrene, ar-methylstyrenes (ar-vinyltoluenes), ar-dimethylstyrenes, α,ar-dimethylstyrenes (ar-isopropenyltoluenes), ar-ethylstyrenes, vinylnaphthalenes, and ar-chlorostyrenes; copolymers of two or more of such alkenylaromatic compounds, e.g. copolymers of styrene and ar-vinyltoluene and of styrene and α-methylstyrene; and copolymers of one or more of such alkenylaromatic compounds and minor proportions, i.e. less than 50 percent by weight of the polymer, of other vinylidene compounds such as olefinic hydrocarbons, e.g. isobutylene and 1,3-butadiene, ethylenically unsaturated esters, e.g. from one to twelve carbon atom alkyl esters of acrylic or methacrylic acid, and acrylonitrile.

Polystyrene and other alkenylaromatic resins have heretofore been sulfonated by reaction thereof with sulfonation agents such as sulfuric acid, oleum, chlorosulfonic acid, sulfur trioxide, and complexes of sulfur trioxide with ethers and ketones.

While polystyrene and other alkenylaromatic resins have been sulfonated by reaction thereof with sulfuric acid to obtain incompletely sulfonated products and water-insoluble sulfonated products, the sulfonation of such alkenylaromatic resins with sulfuric acid to obtain water-swellable and water-soluble resin sulfonates has not been altogether satisfactory. Particular difficulty has been encountered in that the reaction mixture of an alkenylaromatic resin, per se or in solution in a liquid chlorinated hydrocarbon medium, and sulfuric acid rapidly converts to a gummy gelled mass which is difficult to stir or to transfer through pumps and pipelines. These operating difficulties are particularly grave when the operations are carried out on a large, e.g. commercial, scale.

It is among the objects of this invention to provide improvement in the sulfonation of benzene-soluble alkenylaromatic resins of the kind described supra by reaction thereof with sulfuric acid to obtain water-swellable and water-soluble resin sulfonic acids. A more particular object is to provide improvement in the operating procedure for preparing a reaction mixture and carrying out a reaction of sulfuric acid and an alkenylaromatic resin in the presence of a liquid chlorinated aliphatic hydrocarbon medium. Another object is to provide means for obtaining the resin sulfonate product in the form of discrete solidified beads suspended as a slurry in the organic liquid medium. Other objects and advantages of the invention will become apparent in the following description.

The objects of this invention have been attained in an improved process, fully set forth hereinafter, wherein a reaction mixture containing sulfuric acid and a solution of the alkenylaromatic resin is subjected to moderate stirring of the kind obtained with a rotating paddle-type stirrer until the sulfuric acid phase forms semi-solid globular masses, there being present in the reaction mixture a colloidal particle emulsifier-stabilizer as hereinafter specified, and the sulfonation reaction is carried to completion with formation of a slurry of discrete solid beads of the resin sulfonate suspended in the organic liquid medium.

The sulfuric acid for use in this process is preferably ordinary commercial-grade sulfuric acid, although any sulfuric acid can be used which has from 90 to 100 percent strength, i.e. from 90 to 100 percent by weight calculated as $H_2SO_4$.

Examples of liquid chlorinated aliphatic hydrocarbons suitable for use in this process are methylene chloride, chloroform, carbon tetrachloride, ethylene dichloride, 1,1-dichloroethane, methylchloroform, trichloroethylene, perchloroethylene, 1,1,1,2-tetrachloroethane, 1,1,2,2-tetrachloroethane, and mixtures of liquid chlorinated aliphatic hydrocarbons.

The alkenylaromatic resins that have been described hereinbefore are suitable for use in this process.

In carrying out the present process, the alkenyl-aromatic resin to be sulfonated is dispersed and preferably dissolved in a liquid chlorinated aliphatic hydrocarbon solvent in a manner already known per se, in a convenient concentration, usually in the order of from 1 to 25 percent by weight of resin based on the mixture of the same and the organic solvent.

The reaction between the sulfuric acid and the alkenylaromatic resin is carried out by mixing the resulting alkenylaromatic resin-solvent mixture and sulfuric acid together in proportions to get the desired degree of sulfonation of the resin, usually corresponding to from 1 to 10 mole-weights of sulfuric acid per mole-weight of alkenylaromatic compound in the resin to be sulfonated. The concentration of the starting alkenylaromatic resin in the organic medium and the proportion thereof to the sulfuric acid is preferably selected so that the total weight of the starting resin and sulfuric acid is in the range from 5 to 50 percent of the weight of the whole reaction mixture.

The sulfonation reaction between the alkenylaromatic resin and the sulfuric acid is carried out by maintaining the resulting reaction mixture at reaction temperatures, usually between 0° C. and 200° C., preferably between 0° C. and 100° C., at any convenient pressure, while subjecting the reaction mixture to moderate agitation. While the nature of the agitation per se is not highly critical, violent shear should be avoided, and the reaction mixture is preferably subjected to moderate stirring of the kind obtained with a rotating paddle-type stirrer just sufficient to keep the constituents of the reaction mixture well interspersed and to prevent the formation of distinct layers in the reaction zone.

At the beginning of the sulfonation reaction in the described reaction mixture, the sulfuric acid is dispersed as droplets in the fluid organic medium containing the starting resin, the viscosity of the mixture being relatively low. During the course of the sulfonation reaction, the reaction mixture becomes thickened, i.e. the viscosity increases, with the formation of a partially sulfonated resin. As the resin is increasingly sulfonated, it becomes less and less soluble in the organic medium. As the sulfonation reaction continues and the resin is progressively sulfonated to a higher degree, the resin sulfonic acid becomes progressively more polar and less compatible with the chlorinated hydrocarbon liquid medium. The reaction mixture thus undergoes phase transition to one in which a mixture of the sulfuric acid and the resin sulfonic acid is dispersed or slurried in the liquid chlorinated aliphatic hydrocarbon medium. With this transition, the viscosity of the reaction mixture begins to decrease and the reaction mixture has the consistency of a thick creamy emulsion. As the sulfonation continues, the resin sulfonate progresses toward a solid material, and the reaction mixture becomes "grainy." Near the end of the sulfonation reaction, the reaction mixture passes through a physical state where the colloidally dispersed sulfuric acid-resin sulfonate phase coalesces to grains or small granules which grow to globular masses. If the coalescence is allowed to continue unchecked, the mixture tends to "set up" in a semi-solid mass.

It is at the point where the reaction mixture is undergoing coalescence that the present invention provides particular improvement in the described process.

In accordance with this invention, the coalescence of the sulfuric acid-resin sulfonate phase is arrested when the phase has formed spheroidal, globular masses by the presence of a hydrophobic colloidally dispersed water-in-oil emulsifier-stabilizer.

These colloidal particle water-in-oil emulsifier-stabilizers, already known per se, are characterized by a balance of hydrophile-hydrophobe properties such that the equilibrium position of the emulsifier-stabilizers in an oil-water system is on the external, or convex, surface of a water droplet suspended in the oil phase.

In the present instance, and for the present purposes, the discontinuous phase consists of droplets containing sulfuric acid and the continuous phase is the chlorinated aliphatic hydrocarbon. Accordingly, the stabilizer particles are ones whose equilibrium position in such system is on the external, or convex, surface of the sulfuric acid-containing droplets suspended in the chlorinated aliphatic hydrocarbon phase. Obviously, the suitable stabilizers are ones whose function as stabilizer is not adversely affected by reaction with the constituents of the mixture to be stabilized.

The suitability of colloidal particle water-in-oil emulsifier-stablizers for use in the present process can readily be ascertained by carying out a simple test as follows:

Into a closeable container such as a glass vial whose inner surface has preferably been rendered hydrophobic and is not wettable with concentrated sulfuric acid place concentrated sulfuric acid and an at least equal volume of a liquid chlorinated aliphatic hydrocarbon such as perchloroethylene containing a small amount, e.g. from 0.01 to 0.5 percent by weight, of the water-in-oil emulsifier-stabilizer to be tested, leaving ample free space in the container to permit vigorous shaking of the liquid contents. Close the container, and shake vigorously to emulsify the concentrated sulfuric acid into the chlorinated aliphatic hydrocarbon, preferably shaking vigorously for a few seconds, letting stand for a brief interval such as 0.5-1 minute, and repeating such cycle a number of times, e.g. five times. Thereafter, allow the mixture to stand quietly for a time such as five minutes and observe the extent to which the sulfuric acid phase has remained emulsified or has coalesced into a continuous layer. Stabilizers which hold more than 50 percent of the acid in emulsion are here regarded as satisfactory, from 90 to 100 percent being good. Agents which do not hold at least 50 percent of the acid in emulsion are not satisfactory for the present purposes, although in some instances satisfactory results can be obtained by using somewhat larger proportions of such agents. Agents which are required in amounts appreciably greater than about 3 percent by weight of the sulfuric acid phase are generally not economically satisfactory for the present purposes.

Suitable colloidal particle emulsifier-stabilizers for the present purposes are represented by a wide variety of materials, including organic and inorganic materials. In some instances, the required hydrophile-hydrophobe balance is inherent in the material, and in others the balance is attained by treatments which render normally hydrophilic particles more hydrophobic or normally hydrophobic particles more hydrophilic.

One preferred kind of colloidal particle stabilizer for the purposes of this invention comprises finely divided particles of inorganic hydroxy-oxides wherein a portion of the particle surfaces is chemically bonded to hydrocarbon radical-substituted silicon groups such as hydrocarbon-silyl, hydrocarbon-silylene, or hydrocarbon-silylidyne groups.

These kinds of solid particle emulsifier-stabilizers are usually prepared from normally hydrophilic inorganic hydroxy-oxides such as those of aluminum, titanium, iron and silicon, and diatomaceous earth and clays, by incompletely reacting the surface thereof with a hydrocarbon radical-substituted silicon reactant capable of yielding a hydrocarbon-silyl, hydrocarbon-silylene, or a hydrocarbon-silylidyne group, such as a hydrocarbon-halosilane, a hydrocarbon-silanol, a hydrocarbon-silazane, a hydrocarbon aroxysilane, a hydrocarbon-alkoxysilane, or a hydrocarbon-acyloxysilane. The hydrocarbon radicals in these compounds include long and short chain saturated and unsaturated aliphatic hydrocarbon radicals, e.g. alkyl and alkenyl radicals having from one to twenty carbon atoms, aralkyl radicals, alkaryl radicals, and aryl radicals. The preferred organo-silicon reactants are the hydrocarbon-halosilanes including the mono-, di-, and trichloro-, bromo-, and iodo-silanes.

For the purposes of functioning as emulsifier-stabilizers, the finely divided inorganic hydroxy-oxides are reacted with the aforementioned hydrocarbon radical-substituted silicon compounds only to an extent such that an appreciable portion, but not all, of the resulting particle surface is still occupied by the original hydrophilic hydroxy-oxide groups. Stated more specifically, and in terms conventional in the art, the surfaces of the treated solid emulsifier-stabilizer particles for use in this invention are from approximately 25 to approximately 85 percent hydroxylated, the balance of the particle surface being chemically bonded to hydrocarbon-substituted silicon groups as described above. When the surfaces are hydroxylated appreciably outside of this range, the resulting particles are either too hydrophobic or too hydrophilic to act as emulsifier-stabilizers in water-in-oil emulsion systems and are not suitable for the present purposes.

Since these solid particle emulsifier-stabilizers are usually prepared by reacting the inorganic hydroxy-oxides and the organo-silicon compounds in an inert organic liquid medium that can be a liquid chlorinated aliphatic hydrocarbon, it is convenient to prepare and to use the solid particle emulsifier-stabilizers in the form of colloidal suspensions thereof in liquid chlorinated aliphatic hydrocarbons.

Tnother preferred kind of solid particle stabilizer comprises finely divided solid particles of an aminated hydrous aluminum silicate, preferably an aminated montmorillonite such as an aminated bentonite. These emulsifier-stabilizers are hydrous aluminum silicates, usually of the exfoliating montmorillonite type such as bentonite clay, whose base-exchange properties have been modified by amination with organic amines, particularly amines having at least one long hydrocarbon group, e.g. a saturated or unsaturated aliphatic hydrocarbon radical having a chain of from eight to twenty carbon atoms. The amine can be a primary, secondary, tertiary or quaternary ammonium compound, and the other substituent groups can be long or short chain hydrocarbon radicals including one to twenty carbon atom saturated and unsaturated aliphatic hydrocarbon radicals, araliphatic radicals, alkaryl radicals and aryl radicals. By way of specific illustration and not as restrictive, it may be mentioned that a commercially available colloidal particle emulsifier-stabilizer suitable for the purposes of this invention is a dimethyl dioctadecyl ammonium bentonite whose particles are platelets having average diameters of from 0.05 to 1 micron and thickness of from 0.002 to 0.004 micron.

Other examples of suitable emulsifier-stabilizers, for purpose of illustration and not of restriction, include linear, high molecular weight polyethylene; a graft polymer containing 10 percent by weight of acrylic acid grafted on a linear polyethylene; a product obtained from a copolymer of styrene and 5.2 percent by weight of ar-chloromethylstyrene by reacting approximately 50 percent of the chloromethyl groups with trimethylamine; a copolymer of vinylidene chloride and 7.5 percent by weight of acrylonitrile; a copolymer of dichlorostyrene and 5 percent by weight of 1-ethynylcyclohexanol; a ternary copolymer of dichlorostyrene, 5 percent by weight of 1-ethynylcyclohexanol and 2 percent by weight of styrene; and a graft copolymer containing 9 percent by weight of vinylpyrrolidone grafted on a linear polyethylene. It may be noted that some of the aforementioned organic polymer materials "dissolve" in the chlorinated aliphatic hydrocarbon suspending medium to form a colloidal solution, the effective colloidal particle of the stabilizer in such instances probably being a macro-molecule or aggregate of macromolecules of the polymer.

In one embodiment of the present invention, the emulsifier-stabilizer of the kinds just described, colloidally dispersed in a liquid chlorinated aliphatic hydrocarbon medium, is added to the sulfuric acid sulfonation reaction mixture at the stage when the sulfuric acid-resin sulfonate phase is in the form of globules (the reaction mixture being continuously subjected to moderate stirring as aforesaid). The addition of the emulsifier-stabilizer stops the coalescence of the globules of the sulfuric acid-resin sulfonate phase. In the presence of the emulsifier-stabilizer, the sulfonation reaction continues to take place in the stabilized globules, and is usually continued at least until the resin sulfonic acid product is swellable in water. As the sulfonation reaction completes itself, the globules solidify into semi-solid beads which are discrete and non-coalescing towards each other. The resulting completed reaction mixture is a free-flowing slurry of semi-solid beads of the resin sulfonic acid product containing un-reacted sulfuric acid, the beads being suspended in the chlorinated alphatic hydrocarbon liquid medium.

Instead of being added to the reaction mixture at the moment of occurrence of the desired globules of the sulfuric acid-resin sulfonate phase, the colloidal particle emulsifier-stabilizer can be incorporated in the starting reaction mixture, or it can be added to the reacting mixture at any time prior to the coalescence of the mass. It will be understood that the colloidal particle emulsifier-stabilizer can be added to the reaction mixture in a plurality of portions, one or more of which may be added after the initial formation of beads to provide further stability thereto.

In general, the emulsifier-stabilizer is used in amount corresponding to from 0.1 to 2.5 percent by weight based on the combined weight of the resin and sulfuric acid in the reaction mixture. It will be understood that some emulsifier-stabilizers of the kind specified herein are more effective than are others for the present purposes. Usually, a smaller amount of the emulsifier-stabilizer within the range stated can be used when the same is added to the reaction mixture at the occurrence of globules as above described than is necessary when the emulsifier-stabilizer is added earlier. In such instances, i.e. when the emulsifier-stabilizer is added at the occurrence of globules, the amount of such added stabilizer is preferably from 0.1 to 1.0 percent by weight based on the combined weight of the resin and sulfuric acid in the reaction mixture. Moreover, the control of the average size of the globules and resulting beads of resin sulfonate is much more certain when the emulsifier-stabilizer is added to the reaction mixture at the occurrence of the desired globules than when the emulsifier-stabilizer is earlier incorporated into the reaction mixture.

After the completion of the sulfonation reaction, the resin sulfonate product can be recovered from the resulting slurry of beads in the chlorinated aliphatic hydrocarbon liquid medium in usual ways. Because of the stability of the resin sulfonate beads, the slurry can conveniently be handled in commercial operations. For example, the slurry can be filtered, decanted, or centrifuged to obtain a bead portion and a liquid chlorinated aliphatic hydrocarbon portion which can be recovered for reuse or use in other ways. The bead portion can be extracted to remove the unreacted sulfuric acid therefrom and to obtain the alkenylaromatic resin sulfonate in convenient solid bead form.

Instead of recovering the resin sulfonic acid per se from the bead-containing reaction mixture, the acids in that reaction mixture can be converted to salts by addition to the reaction mixture of base-acting materials such as alkali metal hydroxides, ammonia, and amines, and the resulting resin sulfonate salts can then be recovered in bead form from the reaction mixture.

The following examples illustrate the invention but are not to be construed as limiting its scope.

EXAMPLE 1

The starting alkenylaromatic resin in this example was a thermoplastic, solid, benzene-soluble addition polymer of ar-vinyltoluene corresponding to approximately 60 percent by weight of m-vinyltoluene and approximately 40 percent by weight of p-vinyltoluene. A solution of the polymer in nine times its weight of toluene had a viscosity at 25° C. of 1850 centipoises. Forty grams of the polymer was dissolved in 600 ml. of anhydrous methylene chloride, and the solution was mixed with 100 ml. of commercial-grade 98 percent sulfuric acid. The resulting mixture was stirred with a rotating paddle-type stirrer to intersperse the sulfuric acid phase and the methylene chloride phase. The reaction mixture was maintained at approximately room temperature. The viscosity of the reaction mixture increased rapidly. After 13 minutes, the reaction mixture thinned to an emulsion, and the dispersed phase began to coalesce into small globules. At this point there was added to the reaction mixture 20 ml. of a dispersion containing a colloidal particle emulsifier-stabilizer as described below. The globules were thereby stabilized as against further coalescence. After two hours, the resin sulfonate in the reaction mixture was soluble in water (as shown by a test sample). The resulting solid resin sulfonate beads, having an average diameter of approximately one millimeter, were recovered from the reaction mixture by decantation and filtration, washed with concentrated hydrochloric acid to extract unreacted sulfuric acid, and dried. The resin sulfonic acid was water-soluble, sulfonated to an extent corresponding to an average of 85 sulfonic acid groups per 100 benzene rings in the resin sulfonic acid.

The colloidal particle emulsifier-stabilizer dispersion employed in this example was prepared by vigorously agitating 120 grams of a colloidal silica in 4800 ml. of anhydrous methylene chloride with a high-speed rotating impeller homogenizer for one minute, letting the silica dispersion age for two hours, adding thereto a solution of 1200 ml. of anhydrous methylene chloride and 12 ml. of octadecyl trichlorosilane, vigorously agitating the mixture in a high speed rotating impeller homogenizer for four mintues, and letting the resulting dispersion age for six days. The silica used in this preparation was a fumed silica whose particles had average diameters in the order of 15–20 millimicrons and surface area in the order of from 175 to 200 square meters per gram. The 20 ml. of the dispersion employed in the foregoing example contained approximately 0.4 gram of the treated silica.

In another test of the invention, carried out in accordance with the description in Example 1, the slurry of stabilized resin sulfonate beads in the methylene chloride medium was reacted with ammonia by bubbling ammonia gas into the slurry for twelve hours. After removal of the organic liquid, a free-flowing solid beaded product was obtained which contained the ammonium salt of the resin sulfonic acid.

In a similar test, a 50 percent sodium hydroxide aqueous solution was added to the stable bead slurry of resin sulfonic acid reaction mixture until the acids were neutralized, whereby the sodium salt of the resin sulfonate was obtained in solid bead form.

EXAMPLE 2

The starting alkenylaromatic resin used in this example was a thermoplastic solid benzene-soluble polystyrene a solution of which in nine times its weight of toluene had a viscosity at 25° C. of 1350 centipoises. A solution of 15 grams of the polystyrene in 600 ml. of anhydrous methylene chloride and 37.5 ml. of commercial grade 98 percent sulfuric acid were mixed together at 39° C. and stirred with a rotating paddle stirrer. The reaction mixture passed through a viscous state, then thinned out to a smooth emulsion which began to coalesce and to form globules of the separated sulfuric acid-resin sulfonic acid phase. Thereupon there was added to the reaction mixture 50 ml. of the silane-treated silica suspension in methylene chloride described in Example 1, corresponding to approximately one gram of the silane-treated silica emulsifier-stabilizer. Coalescence of the sulfuric acid-resin sulfonic acid phase stopped. The sulfonation reaction and moderate agitation of the reaction mixture at 39° C. were continued for twelve hours at 39° C. and a further sixteen hours at room temperature. The resulting reaction mixture was a free-flowing slurry of discrete solid beads of resin sulfonate suspended in the methylene chloride medium. The solid beads were collected, washed with concentrated hydrochloric acid to extract unreacted sulfuric acid, and dried. The resulting polystyrenesulfonic acid was soluble in water and had an average of approximately 76 sulfonic acid groups per 100 benzene rings in the resin sulfonic acid.

EXAMPLE 3

A solution of 30 grams of the polymer described in Example 1 in 600 ml. of anhydrous methylene chloride was mixed with 75 ml. of commercial grade 98 percent sulfuric acid at 39° C. with rotating paddle stirring. The reaction mixture thickened, then thinned to a smooth emulsion. At this point, prior to any sign of formation of globules, there was added to the reaction mixture 45 ml. of the silane-treated silica suspension in methylene chloride described in Example 1, corresponding to approximately 0.9 gram of the silane-treated silica emulsifier-stabilizer. The sulfuric acid-resin sulfonate phase coalesced into globules having average diameters of approximately one millimeter, whereupon coalescence stopped. The globules solidified into beads, and the resin sulfonate was water-soluble after one hour. The resin sulfonic acid beads were collected in the usual way. Analysis showed an average of 77 sulfonic acid groups per 100 benzene rings in the resin sulfonic acid.

EXAMPLE 4

The starting alkenylaromatic resin used in this example was a thermoplastic, solid, benzene-soluble addition polymer of ar-vinyltoluene corresponding to approximately 60 percent by weight of m-vinyltoluene and approximately 40 percent by weight of p-vinyltoluene. A solution of the polymer in nine times its weight of toluene had a viscosity at 25° C. of 1850 centipoises.

A mixture of 75 ml. of commercial grade 98 percent sulfuric acid and 600 ml. of a 3.5 percent by weight solution of the ar-vinyltoluene polymer in methylene chloride was stirred with a rotating paddle stirrer at room temperature. The reaction mixture thickened, then thinned into a smooth emulsion. After about thirty minutes, the sulfuric acid-resin sulfonate phase began to form globules approximately one millimeter in diameter. To the reaction mixture was then added 0.5 gram of an aminated bentonite dispersed in 15° ml. of methylene chloride. The aminated bentonite was a dimethyl dioctadecyl ammonium bentonite whose particles were platelets having average diameters of from 0.05 to 1 micron and thickness of from 0.002 to 0.004 micron. Coalescence of the globules ceased, and the reaction and stirring were continued for a further three hours, until the resin sulfonate was soluble in water. The resulting reaction mixture was a free-flowing slurry of solid beads suspended in the organic liquid medium. The beads were collected by decantation and filtration, washed with concentrated hydrochloric acid to extract the unreacted sulfuric acid, and dried. The resin sulfonic acid was thereby obtained in free-flowing dry solid bead form, soluble in water.

EXAMPLE 5

The starting alkenylaromatic resin used in this example was a thermoplastic, solid, benzene-soluble addition polymer of ar-vinyltoluene corresponding to approximately 60 percent by weight of m-vinyltoluene and approximately 40 percent by weight of p-vinyltoluene. A solution of the polymer in nine times its weight of toluene had a viscosity at 25° C. of 742 centipoises.

A solution of 30 grams of the polymer in 600 ml. of methylene chloride was mixed with 75 ml. of commercial-grade 98 percent sulfuric acid, and the mixture was stirred with a rotating paddle-type stirrer at room temperature. Eight minutes after starting, the reaction mixture reached maximum viscosity, and after twenty minutes thinned to a colloidal emulsion. After a total time of 85 minutes, the sulfuric acid-resin phase in the reaction mixture began to form globules. To the reaction mixture was then added a colloidal dispersion of 2 grams of an aminated bentonite in 20 ml. of methylene chloride. The aminated bentonite was one whose particles were platelets having average diameters of from 0.05 to 1 micron and thickness of from 0.002 to 0.004 micron and which was aminated with a long chain alkylamine. Coalescence of the globules ceased, and the beads were stabilized at approximately one to two millimeters while the reaction and stirring were continued for a further 40 minutes, whereupon the sulfonation reaction was stopped by addition to the reaction mixture of 100 ml. of 40 percent sulfuric acid. The resulting reaction mixture was a free-flowing slurry of solid beads suspended in the organic liquid medium. The beads were collected by decantation and filtration, washed with concentrated hydrochloric acid to extract the unreacted sulfuric acid, and dried. The resin sulfonic acid was thereby obtained in free-flowing dry solid form. In this instance, the resin sulfonic acid product was swellable by water, forming very viscous aqueous solutions.

EXAMPLE 6

The starting alkenylaromatic resin used in this example was a thermoplastic, solid, benzene-soluble addition polymer of ar-vinyltoluene corresponding to approximately 60 percent by weight of m-vinyltoluene and approximately 40 percent by weight of p-vinyltoluene. A solution of the polymer in nine times its weight of toluene had a viscosity at 25° C. of 8870 centipoises.

In each of a series of tests, a solution of 30 grams of the polymer in 600 ml. of methylene chloride and 90 ml. of concentrated (98 percent) commercial-grade sulfuric acid were stirred together at room temperature. When the resulting reaction mixture had reached the stage where the sulfuric acid-resin phase in the reaction mixture was coalescing to form globules, one of the colloidal particle emulsifier-stabilizers shown in the table below was added in amount shown. In each instance, coalescence of the globules ceased, and the beads of the sulfuric acid-resin phase were stabilized at approximately one to two millimeters diameter. The resulting reaction mixtures were free-flowing slurries of solid beads suspended in the organic liquid medium, from which the resin sulfonate product was recoverable in the manner set forth in preceding examples.

Table

| Test No. | Emulsifier-Stabilizer | Amount, Grams | Notes |
|---|---|---|---|
| 1 | linear polyethylene | 4 | added as dry powder. |
| 2 | ternary copolymer: 93% ar-dichlorostyrene, 5% 1-ethynylcyclohexanol, 2% styrene | 2 | dissolved in 30 ml. CH$_2$Cl$_2$. |
| 3 | graft copolymer: 10% acrylic acid grafted onto linear polyethylene. | 1 | dissolved in C$_2$Cl$_4$ at 60° C. |
| 4 | copolymer: 92.5% vinylidene chloride, 7.5% acrylonitrile | 2 | dissolved in 30 ml. methyl ethyl ketone. |
| 5 | copolymer: 94.8% styrene, 5.2% (chloromethyl) styrene, approx. 50% of the chloromethyl group being reacted with trimethylamine. | 2 | dissolved in 60 ml. CH$_2$Cl$_2$. |

In place of the alkenylaromatic resins used in the foregoing examples, there can be used other of the benzene-soluble solid alkenylaromatic resins of the kind hereinbefore defined with substantially the same results. In place of methylene chloride, other liquid chlorinated aliphatic hydrocarbons and mixtures thereof can be used as solvents for the starting polymers, media for the sulfonation reaction, and media for the colloidal particle emulsifier-stabilizer dispersions with substantially the same results. In place of the colloidal particle emulsifier-stabilizers used in the foregoing examples, there can be used other of the colloidal particle emulsifier-stabilizers of the kinds and having the hydrophile-hydrophobe balance and water-in-oil emulsifying and stabilizing properties hereinbefore set forth, with substantially the same results.

What is claimed is:

1. A process for sulfonation of alkenylaromatic resins with sulfuric acid by mixing together as the only starting materials sulfuric acid of from 90 to 100 percent strength, a solution of from 1 to 25 percent by weight of the solution of an alkenylaromatic resin in an anhydrous liquid chlorinated aliphatic hydrocarbon, and a colloidal particle suspending agent, the starting alkenylaromatic resin being a solid addition polymer of ethylenically unsaturated monomers at least 50 percent by weight of which has the general formula

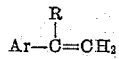

$$\text{Ar}-\underset{\underset{R}{|}}{C}=CH_2$$

wherein Ar— is a monovalent aromatic radical having its valence bond on a carbon atom of a sulfonatable aromatic nucleus and R— is a member of the group consisting of hydrogen and methyl radicals, the anhydrous liquid chlorinated aliphatic hydrocarbon having in its molecular structure from one to two carbon atoms and at least two chlorine atoms, and the colloidal particle suspending agent being one which stabilizes an emulsion consisting of one volume of concentrated sulfuric acid as the sole dispersed liquid phase in at least one volume of the liquid chlorinated aliphatic hydrocarbon as the sole continuous phase and the colloidal particle suspend-weight of such liquid chlorinated aliphatic hydrocarbon phase, mixing said starting materials together in amounts of from 1 to 10 mole weights of sulfuric acid per mole-weight of the alkenylaromatic unit of the resin, a combined weight of starting sulfuric acid and the starting alkenylaromatic resin of from 5 to 50 percent of the total weight of the whole reaction mixture, and from 0.1 to 2.5 percent by weight of the colloidal particle suspending agent based on the combined weight of the starting sulfuric acid and starting alkenylaromatic resin, stirring the materials in the resulting sulfonation reaction mixture by moderate agitation means and interspersing the phases at sulfonation reaction temperatures between 0° C. and 100° C. while sulfonating the starting alkenylaromatic resin to a resin sulfonic acid, and continuing such agitation until there is obtained a free-flowing slurry of the resulting sulfuric acid-resin sulfonic acid phase in the form of discrete beads suspended in the liquid chlorinated aliphatic hydrocarbon medium.

2. A process according to claim 1 wherein the colloidal particle suspending agent is an inorganic hydroxy-oxide on the surfaces of which are hydrocarbon radical-substituted silicon groups in proportion of from 25 to 85 percent hydroxylation of the particle surfaces.

3. A process according to claim 2 wherein the colloidal particle suspending agent is the reaction product of finely divided silica and a hydrocarbon-halosilane.

4. A process according to claim 2 wherein the colloidal particle suspending agent is the reaction product of finely divided silica and octadecyl-trichlorosilane.

5. A process according to claim 1 wherein the colloidal particle suspending agent is a hydrous aluminum silicate having base-exchange properties aminated with a long hydrocarbon chain organic amine.

6. A process according to claim 5 wherein the colloidal particle suspending agent is an aminated bentonite.

7. A process according to claim 6 wherein the colloidal particle suspending agent is dimethyl dioctadecyl ammonium bentonite.

8. A process according to claim 1 wherein the starting alkenylaromatic resin is an addition polymer of ar-vinyltoluene.

References Cited in the file of this patent

UNITED STATES PATENTS 2,604,461    Roth _____ July 22, 1952

UNITED STATES PATENT OFFICE
CERTIFICATE OF CORRECTION

Patent No. 3,033,834　　　　　　　　　　　　　　　　　May 8, 1962

Harold H. Roth

It is hereby certified that error appears in the above numbered patent requiring correction and that the said Letters Patent should read as corrected below.

Column 9, line 61, strike out "ing agent present in amount from 0.01 to 0.5 percent by" and insert the same after "suspend-" in line 3, column 10.

Signed and sealed this 18th day of December 1962.

(SEAL)
Attest:

ERNEST W. SWIDER
Attesting Officer

DAVID L. LADD
Commissioner of Patents